US012593745B2

(12) United States Patent
Plöger

(10) Patent No.: US 12,593,745 B2
(45) Date of Patent: Apr. 7, 2026

(54) CUTTING DEVICE FOR CUTTING PLANTS

(71) Applicant: Grimme Landmaschinenfabrik SE & Co. KG, Damme (DE)

(72) Inventor: Werner Plöger, Bohmte (DE)

(73) Assignee: Grimme Landmaschinenfabrik SE & Co. KG, Damme (DE)

( * ) Notice: Subject to any disclaimer, the term of this patent is extended or adjusted under 35 U.S.C. 154(b) by 548 days.

(21) Appl. No.: 18/007,403

(22) PCT Filed: Jul. 21, 2021

(86) PCT No.: PCT/EP2021/070439
§ 371 (c)(1),
(2) Date: Jan. 30, 2023

(87) PCT Pub. No.: WO2022/023147
PCT Pub. Date: Feb. 3, 2022

(65) Prior Publication Data
US 2023/0276729 A1     Sep. 7, 2023

(30) Foreign Application Priority Data

Jul. 28, 2020     (DE) ......................... 102020119880.9

(51) Int. Cl.
A01D 23/02 (2006.01)

(52) U.S. Cl.
CPC ........ A01D 23/02 (2013.01); *A01D 2023/024* (2013.01)

(58) Field of Classification Search
CPC ........ A01D 23/00–23/06; A01D 23/02; A01D 2023/024
See application file for complete search history.

(56) References Cited

U.S. PATENT DOCUMENTS

| | | | | |
|---|---|---|---|---|
| 2,212,751 A | * | 8/1940 | Powers | A01D 23/02 |
| | | | | 56/121.46 |
| 2,261,324 A | | 11/1941 | Zuckerman et al. | |
| 2,662,361 A | * | 12/1953 | Botimer | A01D 23/02 |
| | | | | 56/121.46 |
| 3,439,480 A | * | 4/1969 | Burns | A01D 23/02 |
| | | | | 56/121.4 |

(Continued)

FOREIGN PATENT DOCUMENTS

| | | | | |
|---|---|---|---|---|
| CN | 101411263 A | | 4/2009 | |
| CN | 107736120 A | | 2/2018 | |
| CN | 108684290 A | * | 10/2018 | A01D 23/02 |

(Continued)

*Primary Examiner* — Joseph M Rocca
*Assistant Examiner* — Madeline I Runco
(74) *Attorney, Agent, or Firm* — Husch Blackwell LLP

(57)     ABSTRACT
A cutting device for cutting plants is provided, and includes at least one cutting unit. The cutting unit has at least one probe element, which is fastened to a holding element and is intended for determining an extent of a plant. Furthermore, the cutting unit has at least one cutting element, which is fastened to a further holding element and is intended for cutting the plant depending on the extent. The cutting unit has at least two frame coupling elements. At least one of the holding elements is coupled to a cutting device frame by means of the frame coupling elements. The holding elements are arranged movably relative to one another.

14 Claims, 12 Drawing Sheets

(56)                    References Cited

U.S. PATENT DOCUMENTS 3,871,161 A * 3/1975 Eisenhardt ............. A01D 23/02
56/121.46

FOREIGN PATENT DOCUMENTS

| | | | |
|---|---|---|---|
| CN | 207927237 | U | 10/2018 |
| CN | 109392411 | A | 3/2019 |
| CN | 110352688 | A | 10/2019 |
| CN | 111264163 | A | 6/2020 |
| DE | 1632852 | A1 | 1/1971 |
| DE | 2250913 | A1 * | 4/1974 |
| DE | 202015105938 | U1 | 12/2015 |
| DE | 102018126211 | A1 | 4/2020 |
| EP | 264011 | A1 | 4/1988 |
| EP | 264011 | B1 | 11/1991 |
| EP | 2098108 | B1 | 8/2012 |
| FR | 1346781 | A * | 12/1963 |

* cited by examiner

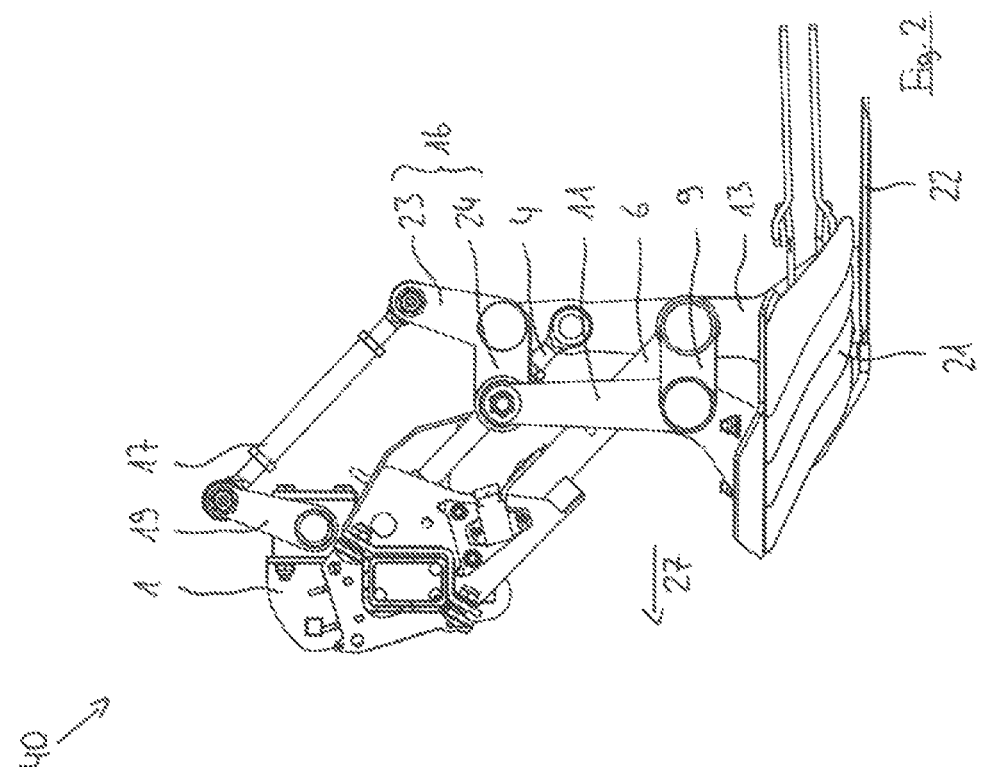
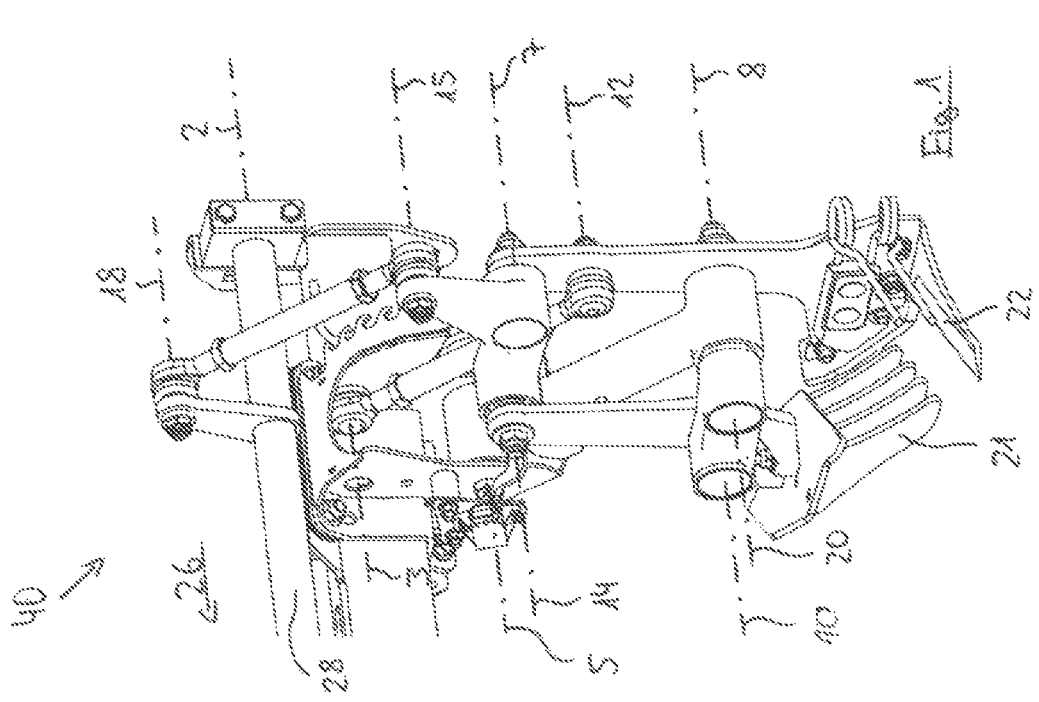

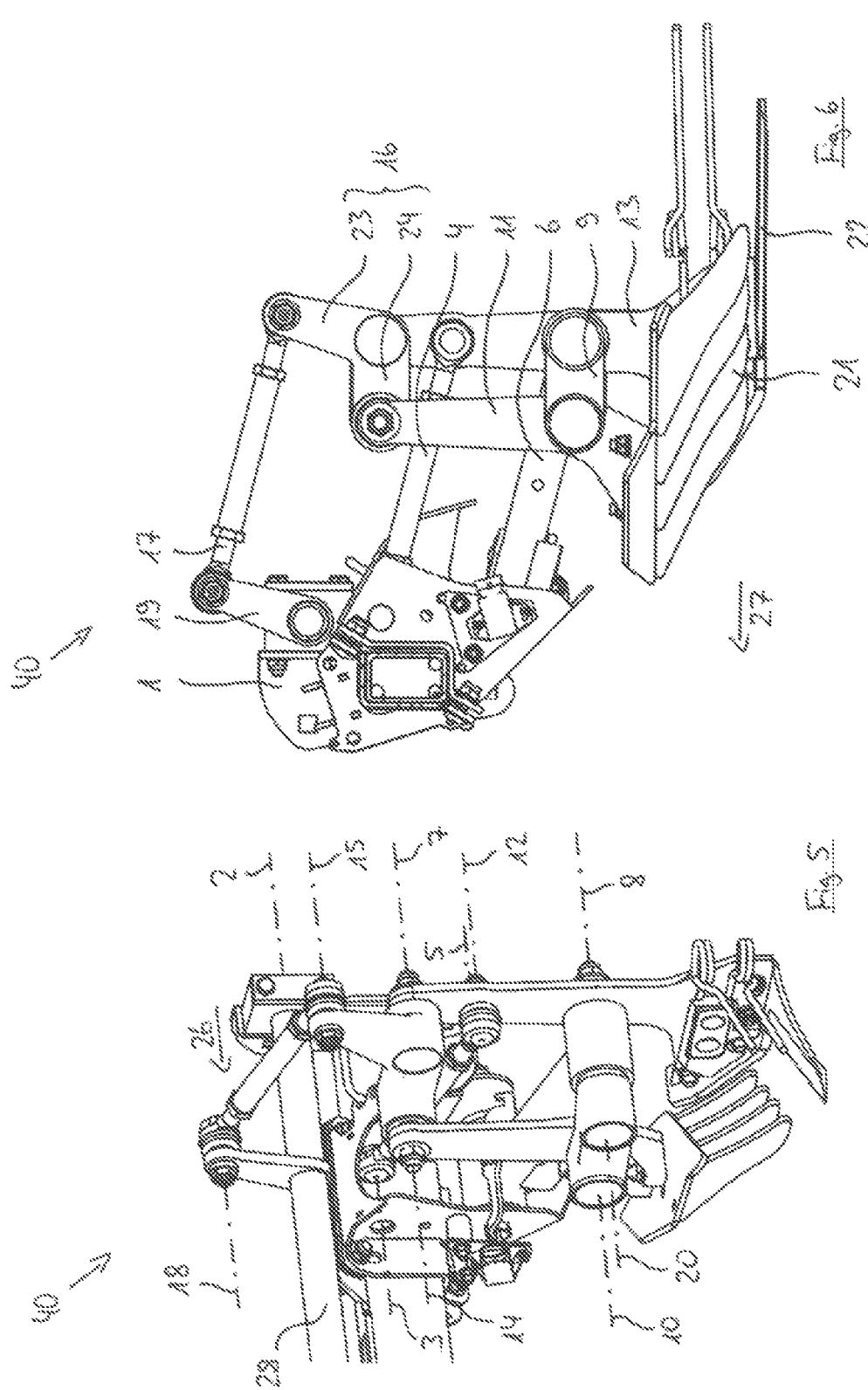

CUTTING DEVICE FOR CUTTING PLANTS

CROSS REFERENCE

This application claims priority to PCT Application No. PCT/EP2021/070439, filed Jul. 21, 2021, which itself claims priority to German Patent Application No. 10 2020 119880.9, filed Jul. 28, 2020, the entireties of which are hereby incorporated by reference.

FIELD OF THE INVENTION

The invention relates to a cutting device for cutting plants. The cutting device comprises at least one cutting unit. The cutting unit has at least one probe element, which is fastened to a holding element and is intended for determining an extent of a plant. Furthermore, the cutting unit has at least one cutting element, which is fastened to a further holding element and is intended for cutting the plant depending on the extent. Furthermore, the cutting unit has at least two frame coupling elements. At least one of the holding elements is coupled to a cutting device frame by means of the frame coupling elements. The holding elements are arranged movably relative to one another.

BACKGROUND OF THE INVENTION

A cutting device is known from the agricultural harvesting technology sector and serves for severing an upper part of beets before they are lifted out of the ground. In particular haulm which is not intended to be harvested with the beets grows out of the part. During operation, the probe element slides temporarily over the beets to be cut in order to predetermine a cutting height for the cutting element.

In order to move the holding elements relative to one another, for example in order to change a height difference between the probe element and the cutting element, and therefore the size of the crop part to be severed, depending on the beet crop, the holding elements should be moved simultaneously relative to the cutting device frame.

By means of a movement of the holding elements relative to the cutting device frame, the dynamics of the probe element change during operation and the force with which the probe element acts on the beets to be cut is increased or reduced. Too high a force regularly causes, during operation, the position of the beets to be cut in/on the ground to be changed unintentionally; in particular, they may be knocked over and consequently may no longer be cut at the correct point. Too low a force prevents sufficient contact between the probe element and consecutive beets of differing size, and therefore the lower beets are cut at too great a height.

BRIEF SUMMARY OF THE INVENTION

It is the object of the present invention to provide a cutting device and a device with the cutting device that avoids the aforementioned disadvantages and permits reliable cutting of plants and improved adaptability to different operating conditions.

According to the invention, the cutting device comprises an adjustment device which is designed to adjust the holding elements relative to one another. The adjustment is independent of a movement of at least one of the holding elements relative to the cutting device frame.

The adjustment device is designed in particular to adjust the holding elements relative to one another, the adjustment being independent of the extent of plants to be cut or which have been cut or the extent of the crops thereof or a vicinity of said crops to the cutting device frame. The adjustment device is preferably designed to adjust the holding elements relative to one another when the cutting device is not in operation, i.e. when plants are not being cut, and/or during operation of the cutting device, i.e. when crops are being cut.

By means of the cutting device according to the invention, the height difference, i.e. in particular a distance between probe surfaces of the probe element and a cutting edge of the cutting element with respect to a vertical direction, and, as a result, the extent of the plant or crop part to be cut off can be varied without the dynamics of the probe element or the forces acting from them on the crops thus being changed. In particular, the achievement according to the invention of the object makes it possible for the holding elements to be adjusted relative to one another which is independent of an angular position of at least one of the frame coupling elements relative to the cutting device frame. The height difference is preferably not dependent even on a position of the cutting device frame, in particular on the height thereof relative to a contact area of the cutting device, and therefore the cutting device frame can be mounted immovably.

With the cutting device according to the invention, a starting position of the first holding element relative to the cutting device frame can be preselected preferably depending on the plant crop to be cut, in particular depending on the type or size of the plants and on the optimum force for sensing same. During operation, the probe element in order to sense the extent in the case of varying plant heights moves in particular up and down about the starting position. The cutting element follows the probe element and cuts each plant at the desired height set by the adjustment device. The height, that is to say the height difference between the probe element and the cutting element, is in particular independent both of the starting position of the cutting unit and on the movements of the cutting unit about the starting position.

The cutting unit preferably comprises at least one restoring element which is arranged in particular on one of the frame coupling elements and/or on the cutting device frame. The restoring element, which is designed in particular as a spiral spring, is preferably designed to be adjustable in order to increase and/or in order to reduce the force with which the probe element acts on the plants to be cut. The restoring element, in particular the spring force thereof, is preferably adjustable manually and/or in an automated way, that is to say by means of a control console, when the cutting device is not in operation and/or during operation of the cutting device. By this means, the cutting device according to the invention can be configured even better in accordance with the plant crop to be cut.

The holding elements are included by the cutting device, in particular by the cutting unit. The cutting element and the probe element, in particular at least during operation, are fastened in a positionally fixed and immovable manner to the respective holding element. The probe element comprises in particular a plurality of probe runners which are designed for direct contact with the crops to be cut. The extent to be determined is in particular a height of the plant or of the crop relative to the contact area of the cutting device. The cutting element is arranged downstream of the probe element preferably in a direction of travel in order to perform cutting depending in each case on the extent of the plant. The cutting unit is preferably configured in such a manner that the cutting element severs beets in the upper region thereof with an at least substantially horizontal cut in order to remove haulm parts from the beets. The direction of travel is the direction in which the cutting device or a drive vehicle coupled thereto moves during operation.

The cutting device frame of the cutting device is not included by the cutting unit. The cutting device frame is in particular arranged upstream of the cutting unit in the direction of travel and extends beyond the at least one cutting unit preferably in a horizontal transverse direction, which is orthogonal to the direction of travel. In particular, the cutting device frame is designed as a transverse support, preferably as a square tube.

The frame coupling elements are preferably each arranged pivotably on the cutting device frame and pivotably on a first of the holding elements. In particular, the frame coupling elements form a first parallelogram guide. Owing to the fact that the frame coupling elements form a parallelogram guide, the first holding element describes a translatory movement along a circular path during an adjustment thereof relative to the cutting device frame. As a result, the probe element or the cutting element which is arranged on the first holding element is always oriented optimally with respect to the plant to be cut.

A parallelogram guide is distinguished basically in that it comprises at least two coupling elements which in particular extend in elongated form and in parallel and which are each arranged pivotably both on a first coupled element and on a second coupled element. The distance between the two pivot axes of the one coupling element is identical here to the distance between the two pivot axes of the other coupling element(s). In addition, the distance between the pivot axes of the one coupled element is identical to the distance between the corresponding pivot axes of the other coupled element.

The holding elements are preferably coupled in such a manner that they are movable at least partially, in particular exclusively, in a translatory manner relative to one another. By this means, both the probe element and the cutting element during operation, even when set differently relative to one another, are in each case oriented in the best possible way with respect to the plant to be cut.

The two holding elements are preferably coupled to one another by means of at least two holding coupling elements which are arranged pivotably on the two holding elements. The holding coupling elements in particular form a second parallelogram guide. It is thereby realized in a structurally simple manner that both the cutting element and the probe element during operation are always oriented in the best possible way with respect to the plant to be cut. By means of this design, preferably the first of the holding elements is arranged on the frame coupling elements and a second of the holding elements is coupled to the cutting device frame by means of two parallelogram guides. Preferably, a first frame coupling element and a first holding coupling element are arranged on the first holding element so as to be pivotable about the same pivot axis relative thereto. Particularly preferably, a second frame coupling element and a second holding coupling element are arranged on the first holding element so as to be pivotable about the same pivot axis relative thereto. By means of this design, the cutting device is particularly compact and has minimal inertia during operation, as a result of which it can also be operated, depending on the plant crop to be cut, in such a manner that the forces acting on the plants to be cut are minimal.

As an alternative to the holding coupling elements, the holding elements are preferably mounted displaceably relative to one another. In particular, the holding elements are coupled to one another via a sliding guide and are displaceable with respect to one another in a direction angled with respect to a horizontal. For this purpose, the adjustment device is arranged in particular in the region of the sliding guide.

In an advantageous refinement of the invention, the cutting device, in particular the adjustment device of the cutting device, comprises at least one adjustment element for adjusting the holding elements, which adjustment element is arranged pivotably, in particular exclusively pivotably, on the cutting device frame. An adjustment frame pivot axis, about which the adjustment element is pivotable relative to the cutting device frame, is preferably in a fixed position relative to the cutting device frame. The adjustment element is coupled indirectly or directly to the cutting unit. In particular, the adjustment device is arranged on one of the holding elements or on one of the holding coupling elements. By means of the mounting of the adjustment element, the latter is arranged in particular outside the region of the holding elements and is therefore protected against soiling and increased wear.

Alternatively or additionally to the previously described adjustment element, the adjustment device preferably comprises a pneumatic cylinder, a hydraulic cylinder, an electric linear drive, an electric motor and/or a hydraulic motor. Said cylinder/drive/motor is arranged in particular on the cutting device frame or on the cutting unit.

The cutting device, preferably the adjustment device of the cutting device, preferably comprises an adjustment coupling element arranged in particular on the adjustment element. The adjustment coupling element is arranged in particular on a first holding coupling element and/or on the second holding element. The adjustment element is preferably coupled to the cutting unit exclusively by means of the adjustment coupling element. In particular, the adjustment coupling element is arranged both on the adjustment element and on the first holding coupling element or on the second holding element exclusively so as to be pivotable about one or more axes. By means of the design of the adjustment coupling element, the adjustment device is realized in a structurally simple and thereby failure-proof way.

The first holding coupling element has in particular an adjustment coupling portion and a holding coupling portion. The adjustment coupling portion runs at least in sections, in particular over the entire length, between a first holding pivot axis and a first adjustment coupling pivot axis. The holding coupling portion runs at least in sections, in particular exclusively, between the first holding pivot axis and a second holding pivot axis. The first holding coupling element is pivotable relative to the first holding element about the first holding pivot axis. The first holding coupling element is pivotable relative to another of the holding elements in each case about the second holding pivot axis. The adjustment device, in particular the adjustment coupling element, is pivotable relative to the first holding coupling element or to the second holding element about the first adjustment coupling pivot axis.

The first holding pivot axis, the second holding pivot axis and the first adjustment coupling pivot axis are in particular not arranged in one plane. The adjustment coupling portion preferably runs in an angled manner, particularly preferably by less than 90°, relative to the holding coupling portion. By means of this design, the first holding coupling element is configured in particular as a toggle lever. The holding coupling portion together therewith preferably forms the second parallelogram guide. By means of this design of the first holding coupling element, relatively large forces in the individual necessary pivot bearings can be avoided and at the same time the requirement of the cutting device for construction space can be reduced.

In an advantageous refinement of the invention, the adjustment element and the first holding coupling element, in particular the adjustment coupling portion thereof, form a third parallelogram guide at least in a position of the first holding element relative to the cutting device frame. The first holding coupling element is preferably designed in such a manner that it forms together therewith both the second parallelogram guide and the third parallelogram guide, in particular with the same portion of the first holding coupling element. In the preferred refinement, the adjustment element, the first holding coupling element and the second holding coupling element form the same parallelogram guide. In particular, the second holding pivot axis and the first adjustment coupling pivot axis are identical. By means of this design, in said position of the first holding element, the holding elements can be adjusted exclusively in a translatory manner with respect to one another by means of the adjustment device in a structurally simple way.

The adjustment frame pivot axis and at least the first frame pivot axis are preferably at a distance from one another, which distance corresponds to the distance of the third holding pivot axis from the first holding pivot axis or to the distance of the second holding pivot axis from the first adjustment coupling pivot axis or to the sum of the two last-mentioned distances. The adjustment element is arranged pivotably relative to the cutting device frame about the adjustment frame pivot axis. The first holding coupling element is preferably arranged pivotably relative to the first holding element about the second holding pivot axis. The first holding coupling element is preferably arranged pivotably on the second holding element about the first holding pivot axis. Alternatively or additionally, the first frame pivot axis is identical to the adjustment frame pivot axis, and/or the third holding pivot axis is identical to the first holding pivot axis, and/or the second holding pivot axis is identical to the first adjustment coupling pivot axis. In this case, the aforementioned distances are in particular in each case not present. The axes mentioned in particular all run parallel to one another and in the transverse direction.

Particularly preferably, a second adjustment coupling pivot axis is at a distance from the first adjustment coupling pivot axis, which distance corresponds to the distance of a first frame pivot axis from the third holding pivot axis. The adjustment coupling element is pivotable relative to the adjustment element about the second adjustment coupling pivot axis. The adjustment coupling element is pivotable here relative to the first or second holding element and/or to the first holding coupling element about the first adjustment coupling pivot axis. A first frame coupling element is pivotable relative to the cutting device frame about the first frame pivot axis. The first frame coupling element is arranged pivotably on the first holding element about the third holding pivot axis. The distance corresponds in particular also to the distance of a second frame pivot axis from a fifth holding pivot axis. A second frame coupling element is pivotable relative to the cutting device frame about the second frame pivot axis. The second frame coupling element is pivotable relative to the first holding element about the first holding pivot axis.

By means of the above-described design, the adjustment coupling element, the first frame coupling element and optionally the second frame coupling element form a parallelogram guide which is preferably the first parallelogram guide, in which the adjustment coupling element is integrated. By means of this design, the previously described advantage can be achieved not only in a position of the first holding element relative to the cutting device frame, but independently of the position of the holding elements relative to the cutting device frame.

In particular, said pivot axes, at least the adjustment coupling pivot axes and the frame pivot axes, run parallel to one another and in each case in the transverse direction. The main direction of extent of the adjustment coupling element is preferably parallel here to the main direction of extent of the frame coupling elements. Alternatively, the main direction of extent of the adjustment coupling element is not identical to the main directions of extent of the frame coupling elements.

In a preferred refinement of the invention, the adjustment coupling element is variable in length and the distance between the adjustment coupling pivot axes can be varied. By means of this possibility, a dependency of the height difference between probe element and cutting element on the position of the cutting unit relative to the cutting device frame can be achieved. This dependency can be useful for individual types of plant, in particular types of beet. The frame coupling elements in particular have a non-adjustable length. At least one of the frame coupling elements is designed in particular in such a manner that pivoting of the holding elements relative to the cutting device frame about a pivot axis which differs from the transverse direction is thereby prevented. The probe element and the cutting element are thereby at any rate arranged consecutively in the direction of travel.

The second holding element is preferably arranged at least in sections between the cutting device frame and the first holding element in a direction of travel. In particular, the first holding element follows the second holding element in the direction of travel. By means of this design, the first and the second parallelogram are superimposed in a side view, as a result of which the cutting device according to the invention has a particularly small construction.

Preferably, at least the holding elements are formed at least predominantly, in particular exclusively from aluminum. By this means, in turn, the inertia of the cutting unit and therefore the force with which the latter acts at least on the plant during operation are reduced.

In an advantageous refinement of the invention, the cutting device comprises at least two cutting units, wherein the adjustment device is designed to adjust holding elements of different cutting units. In particular, each cutting unit is assigned an adjustment element. The adjustment elements assigned to the different cutting units are preferably positionally fixed and fixed in position relative to one another. In particular, the cutting device comprises a transverse adjustment element extending in the transverse direction and along the cutting units. Preferably, the adjustment elements are fastened to the transverse adjustment element and, together with the transverse adjustment element, preferably form a crankshaft. The adjustment elements are preferably arranged here one behind another, as viewed in the transverse direction, i.e. the second adjustment coupling pivot axes are identical. By means of the central adjustment device, the holding elements of the cutting units can be adjusted particularly simply with respect to one another and the adjustment device can be formed structurally particularly simply.

In particular, the cutting device comprises a restoring adjustment device arranged on restoring elements of at least two cutting units. Said restoring adjustment device preferably comprises a restoring adjustment element which extends in the transverse direction and by means of which a plurality of restoring elements can be tensioned or relaxed.

The adjustment of the restoring force is therefore also centrally adjustable preferably in an automated way.

Preferably, at least one of the cutting units can be transferred in the transverse direction relative to the cutting device frame from a first working configuration into a second working configuration. In particular, a transverse adjustment device is arranged on the one cutting unit for transferring same in the transverse direction. The adjustment element assigned to the cutting unit is designed in particular to adjust the holding elements of the cutting unit in the first and in the second working configuration. In particular, the cutting unit is arranged displaceably in the transverse direction in relation to the cutting device frame, whereas the adjustment element is arranged immovably in the transverse direction. By means of the different working configurations of the at least one cutting unit, the cutting device can be used in plant cultures having different row widths.

For use of the cutting device in beet cultures having different row widths, longitudinal center planes of adjacent cutting units are preferably at a distance of 45 cm from one another in the first working configuration, and at a distance of 50 cm from one another in the second working position. The adjustment element assigned to the transferrable cutting unit is in particular arranged centrally between the longitudinal center plane of one of the cutting units in the second working configuration and the longitudinal center plane of the same cutting unit in the first working configuration. By means of this design, an adaptability of the cutting device to different row widths can be combined with the aforementioned advantages. Alternatively, every two cutting units are immovable relative to one another in the transverse direction, but are jointly movable relative to at least one further cutting unit in the transverse direction. By this means, in particular in the two working configurations, the cutting units are each at a transverse offset from the row to be cut, the transverse offset being small enough not to substantially worsen the cutting result. The structural outlay can thereby be significantly reduced.

The adjustment coupling element is preferably arranged on the adjustment element so as to be pivotable about a working position pivot axis differing from the first adjustment coupling pivot axis. The adjustment element is designed here in such a manner that it remains fixed in position relative to the cutting device frame, in particular at least in the transverse direction, during the transfer of the cutting unit from the first into the second working configuration. In particular, the adjustment coupling element runs both in the first and in the second working configuration of the cutting unit at an angle, in a plan view, with respect to the direction of travel and, in particular in the two working positions, is angled by the same angular amount relative to the direction of travel, in particular independently of pivoting of the adjustment coupling element about the second adjustment coupling pivot axis. The at least one adjustment element preferably comprises a ball and socket joint or a second pivot bearing, as a result of which the movability of the adjustment element with respect to the adjustment coupling element about the two pivot axes is realized. In particular, the adjustment coupling element is longer than the frame coupling elements of the cutting device according to the invention.

In particular, at least three cutting units are each transferrable in a transverse direction from a first working position into a second working position. The distance of the longitudinal center plane of a first cutting unit in the first working configuration from the longitudinal center plane of the first cutting unit in the second working configuration is preferably greater here than the distance of the longitudinal center plane of a second cutting unit in the first working configuration from the longitudinal center plane of the second cutting unit in the second working configuration. The angular amount by which the adjustment coupling element assigned to the first cutting unit is angled with respect to the direction of travel in the working positions differs correspondingly from the angular amount of the adjustment coupling element assigned to a second cutting unit in the working configurations thereof. As an alternative to the pivotability of the adjustment coupling element about the working position pivot axis, the initially one adjustment element is preferably arranged displaceably in the transverse direction on the transverse adjustment element such that it is arranged directly upstream of the associated cutting unit in the direction of travel both in the first and in the second working position.

The object is furthermore achieved by a device which comprises an above-described and/or below-described cutting device and a haulm removal device arranged upstream of the cutting device in the direction of travel. The haulm removal device preferably has a haulm removal element rotating about an axis of rotation during operation. The cutting device frame is arranged in a fixed position relative to the axis of rotation at least during operation. The device preferably also comprises lifting shares or lifting disks for lifting beets. The haulm removal device is designed in particular as a haulm topper or haulm flail. In particular, the device is designed as a lifting attachment for a beet harvesting machine. The cutting device is designed in particular as an after topper for the beets.

The device comprises in particular a sensor for measuring the position of the cutting unit relative to the cutting device frame. The sensor is designed in particular as a protractor which, during operation, measures the angle of one of the frame coupling elements relative to the cutting device frame. The height of the haulm removal device is preferably set on the basis of the data measured by the sensor. In the evaluation of the signals from the sensor, the height of the cutting device frame no longer needs to be taken into consideration as the dependency of the height difference between the cutting element and the probe element on the height of the cutting device frame above the ground is not present. The height to be set for the haulm removal device can therefore be calculated more rapidly and merely on the basis of the sensor signals.

The object is furthermore achieved by a beet harvesting machine having the above-described and/or below-described cutting device or having the above-described and/or below-described device.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 shows a perspective illustration of a cutting unit of a first cutting device according to the invention in a first working position.

FIG. 4 shows a further perspective illustration of the cutting unit according to FIG. 1.

FIG. 5 shows the perspective illustration according to FIG. 1, with the cutting unit being in a second working position.

FIG. 6 shows a side view according to FIG. 2, with the cutting unit being in the second working position.

DETAILED DESCRIPTION OF THE DRAWINGS

Figure 2:
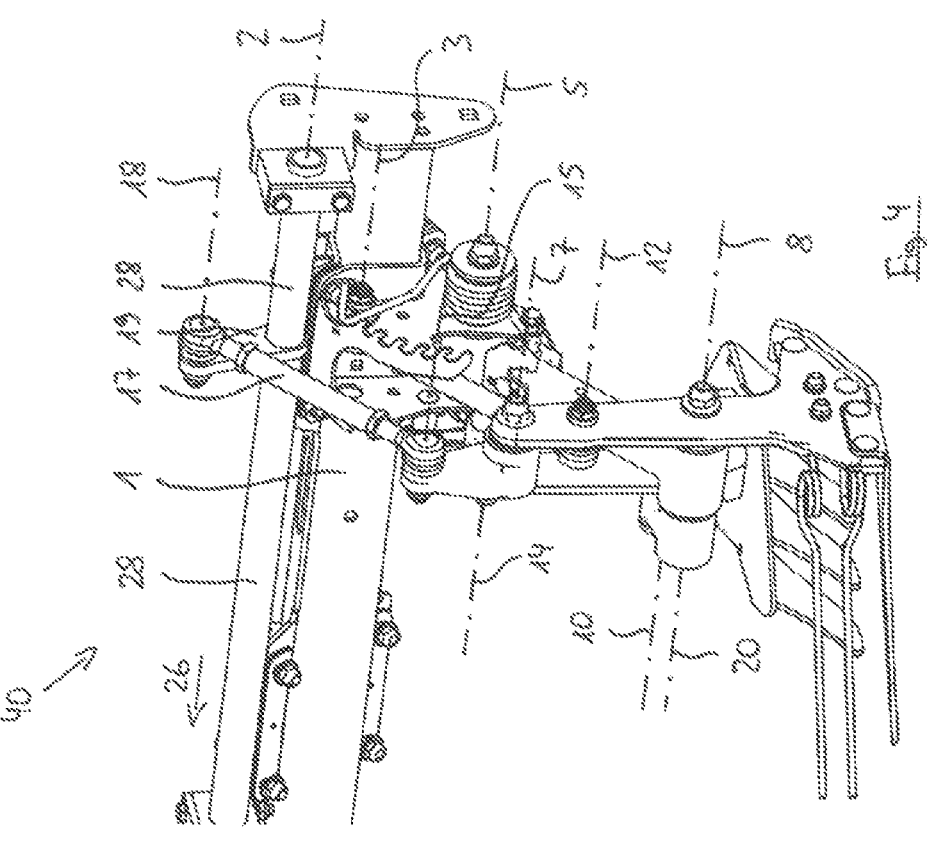
FIG. 2 shows a side view of the cutting unit according to FIG. 1.

The features explained below of the exemplary embodiments according to the invention can also be the subject matter of the invention individually or in different combinations than illustrated or described. Where expedient, functionally identically acting parts are provided with identical reference numbers.

FIGS. 1 to 6 show a cutting unit 41 of a first exemplary embodiment of a cutting device 40 according to the invention. The cutting device 40 is designed for cutting beet tops. The cutting unit 41 comprises a probe element 21, which is fastened to a second holding element 11 and is intended for determining an extent of the beets. Furthermore, the cutting unit 41 comprises a cutting element 22, which is fastened to a first holding element 13 and is intended for cutting the beets depending on the determined extent. The cutting element 22 comprises an elongate blade. During operation of the cutting device 40, the latter is moved in a direction of travel 27, and the probe element 21 rests at least temporarily on the beets, whereupon the cutting element 22 subsequently cuts the beets.

The cutting unit 41 has two frame coupling elements 4, 6. The first holding element 13 is coupled to a cutting device frame 1 by the frame coupling elements 4, 6. The frame coupling elements 4, 6 are each arranged pivotably on the cutting device frame 1 and on the first holding element 13 and form a first parallelogram guide (cf. in this respect the schematic FIGS. 7-10 explained below).

The holding elements 11, 13 are coupled movably to one another by means of two holding coupling elements 9, 16 which are arranged pivotably on the two holding elements 11, 13 and form a second parallelogram guide. The cutting device 40 comprises an adjustment element 19, which is assigned to the cutting unit 41 and is intended for adjusting the holding elements 11, 13 and which is arranged pivotably on the cutting device frame 1. An adjustment coupling element 17 which is also arranged on a first of the holding coupling elements 16 is arranged on the adjustment element 19. The adjustment element 19 and the adjustment coupling element 17 are included by an adjustment device 42 which is designed for adjusting the holding elements 11, 13 relative to one another and which is independent of a movement of at least one of the holding elements 11, 13 relative to the cutting device frame 1.

The first holding coupling element 16 has an adjustment coupling portion 23 and a holding coupling portion 24. The adjustment coupling portion 23 reaches from a first holding pivot axis 7 as far as a first adjustment coupling pivot axis 15. The first holding coupling element 16 is arranged on the first holding element 13 so as to be pivotable about the first holding pivot axis 7. The adjustment coupling element 17 is pivotable relative to the first holding coupling element 16 about the first adjustment coupling pivot axis 15. The holding coupling portion 24 is arranged between the holding pivot axis 7 and a second holding pivot axis 14. The first holding coupling element 16 is arranged on the second holding element 11 so as to be pivotable about the second holding pivot axis 14.

The adjustment element 19 is pivotable relative to the adjustment coupling element 17 about a second adjustment coupling pivot axis 18. The adjustment element 19 is arranged in a fixed position on a transverse adjustment element 28 which is designed as a tube, extends in a transverse direction 26 and is arranged on the cutting device frame 1 so as to be pivotable together with the adjustment element 19 about an adjustment frame pivot axis 2. The adjustment element 19 and the holding coupling element 16, specifically the adjustment coupling portion 23 thereof, form a third parallelogram guide and also the second parallelogram guide.

The first frame coupling element 4 is pivotable relative to the cutting device frame 1 about a first frame pivot axis 3. The second frame coupling element 6 is pivotable relative to the cutting device frame 1 about a second frame pivot axis 5. The first frame coupling element 4 is pivotable relative to the first holding element 13 about a third holding pivot axis 12. A second holding coupling element 9 is pivotable relative to the first holding element 13 about a fourth holding pivot axis 20. The frame coupling element 6 is pivotable relative to the holding element 13 about a fifth holding pivot axis 8. In the exemplary embodiments which are shown, the fifth holding pivot axis 8 and the fourth holding pivot axis 20 coincide. The second holding coupling element 9 is pivotable relative to the second holding element 11 about a sixth holding pivot axis 10.

The second adjustment coupling pivot axis 18 is spaced apart from the first adjustment coupling pivot axis 15 to the same extent as the first frame pivot axis 3 is from the third holding pivot axis 12. The adjustment frame pivot axis 2 is spaced apart from the first frame pivot axis 3 to the same extent as the third holding pivot axis 12 is from the first holding pivot axis 7. The second holding element 11 is arranged between the cutting device frame 1 and the first holding element 13 with respect to a direction of travel 27.

Figure 3:
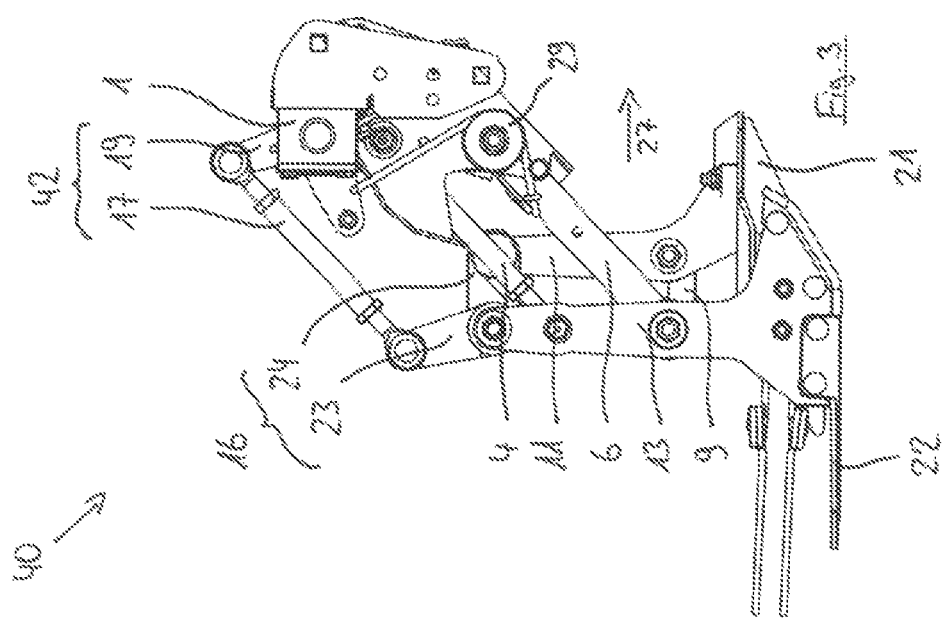
FIG. 3 shows an opposite side view, with respect to FIG. 2, of the cutting unit according to FIG. 1.

A restoring element 29 is arranged in the region of the second frame pivot axis 5 (cf. FIG. 3). The restoring element 29 is arranged as a spiral spring between the cutting device frame 1 and the second frame coupling element 6. A protractor, not shown, is additionally arranged here.

FIGS. 1 to 4 show the cutting unit 41 in a corresponding position of the adjustment device 42 and in the same working position, i.e. position relative to the cutting device frame 1. FIGS. 5 and 6 show the same cutting unit 41 in a different working position, but in the same position of the adjustment device 42.

The function of the cutting device 40 according to the invention is clarified by the schematic illustrations according to FIGS. 7-10. The second exemplary embodiment thereby shown schematically corresponds in respect of previously described components and the connections thereof substantially to the first exemplary embodiment (cf. FIGS. 1 to 6). In addition, the second exemplary embodiment has a central adjustment element 25 which is arranged pivotably on the transverse adjustment element 28 and is illustrated by dashed lines.

Figure 8:
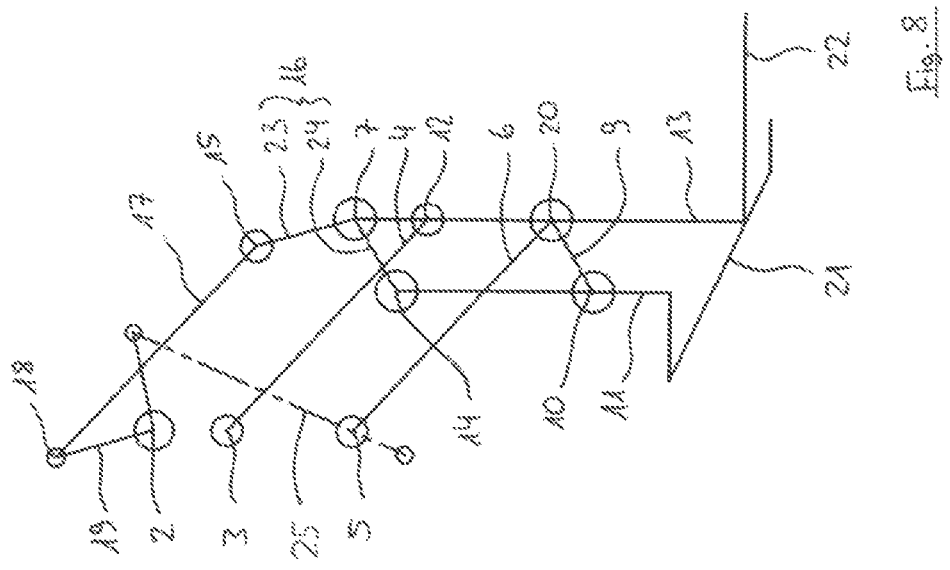
FIG. 8 shows the schematic side view according to FIG. 7, with the cutting unit being in a second working position.
Figure 7:
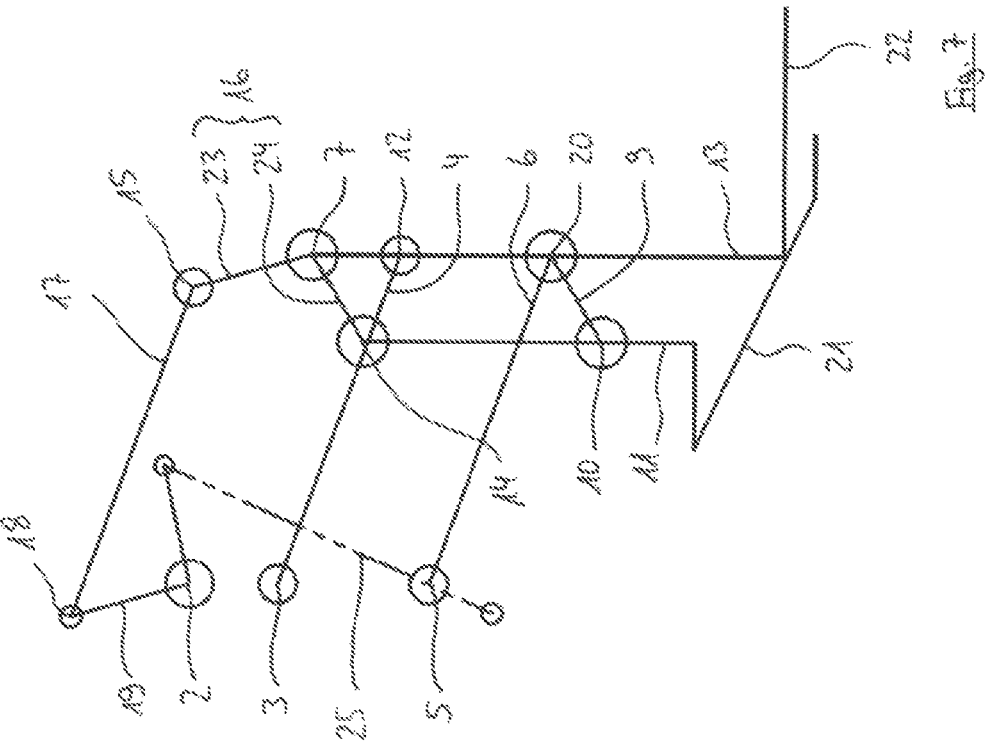
FIG. 7 shows a schematic side view of a cutting unit of a second cutting device according to the invention in a first working position.

FIGS. 7 and 8 show how far the positioning of the cutting element 22 relative to the probe element 21, which positioning is changeable by means of the adjustment device 42, is independent of an up or down movement of the holding elements 11, 13 relative to the cutting device frame 1. While, in the working position according to FIG. 7, the frame coupling elements 4, 6 run relatively flatly and the holding elements 11, 13 are set to be relatively high with respect to the cutting device frame 1, the frame coupling elements 4, 6 in FIG. 8 have a significantly steeper profile and the holding elements 11, 13 are correspondingly arranged significantly lower relative to the cutting device frame 1. Owing to the second parallelogram guide, the positioning of cutting element 22 and probe element 21 with respect to each other is independent of the height of the holding elements 11, 13 relative to the cutting device frame 1.

Figure 10:
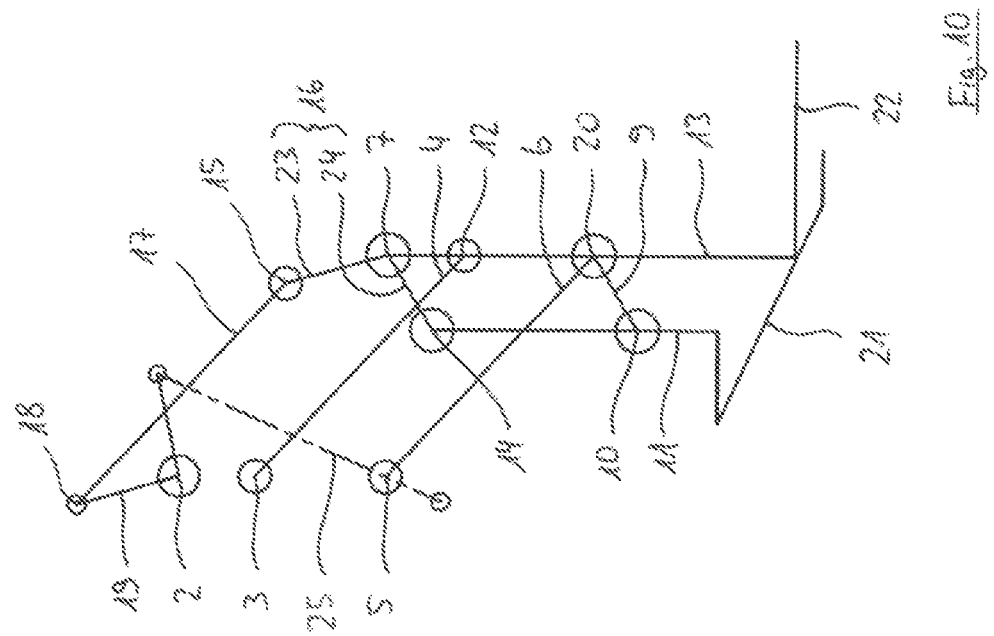
FIG. 10 shows the schematic side view according to FIG. 7, with the cutting unit being in a second position.
Figure 9:
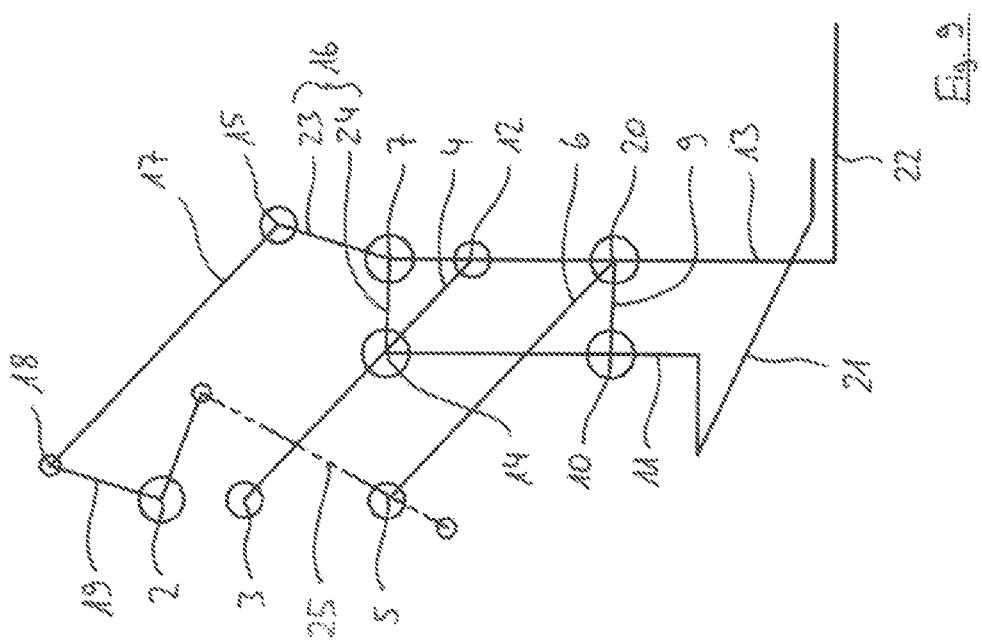
FIG. 9 shows the schematic side view according to FIG. 7, with the cutting unit being in a first position.

FIGS. 9 and 10 show the second exemplary embodiment in different positions of the adjustment device 42, but in the same working position. The positions shown differ from one another solely by the fact that the adjustment device 42 has brought the probe element 21 into a different position relative to the cutting element 22. The cutting element 22 remains here in the same position relative to the cutting device frame 1. Between FIG. 9 and FIG. 10, the probe element 21 has been released together with the second holding element 11 relative to the cutting element 22 by rotation of the adjustment element 19 counterclockwise. Use is made for this purpose of the second parallelogram guide which permits such a movement independently of an adjustment of the first holding element 13 relative to the cutting device frame 1.

Figure 11:
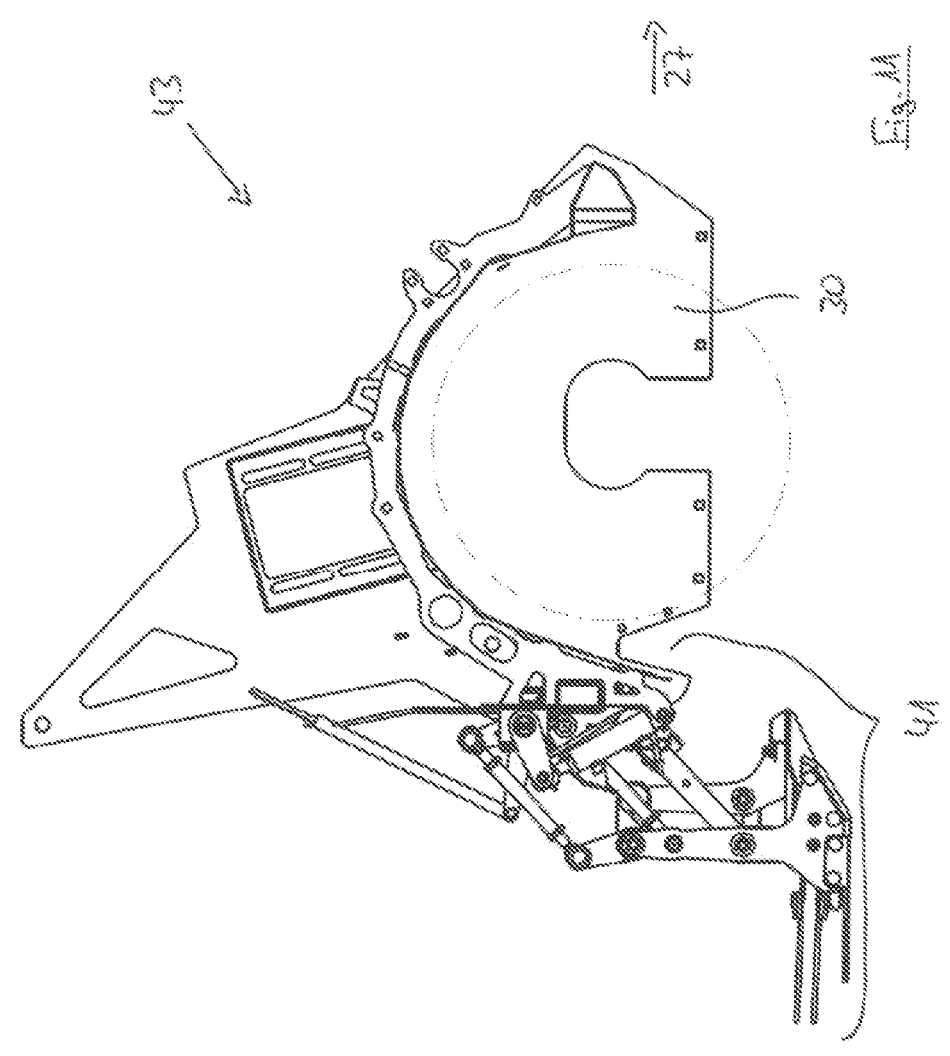
FIG. 11 shows a side view of a first device according to the invention.

FIG. 11 shows a first device 43 according to the invention with a cutting device 40, of which a cutting unit 41 is visible. A haulm removal device 30, which is merely indicated graphically, is arranged upstream of the cutting device 40 in the direction of travel 27. The haulm removal device 30 comprises a haulm removal element rotating about an axis of rotation during operation. The axis of rotation is positionally fixed here with respect to the cutting device frame 1.

Figure 12:
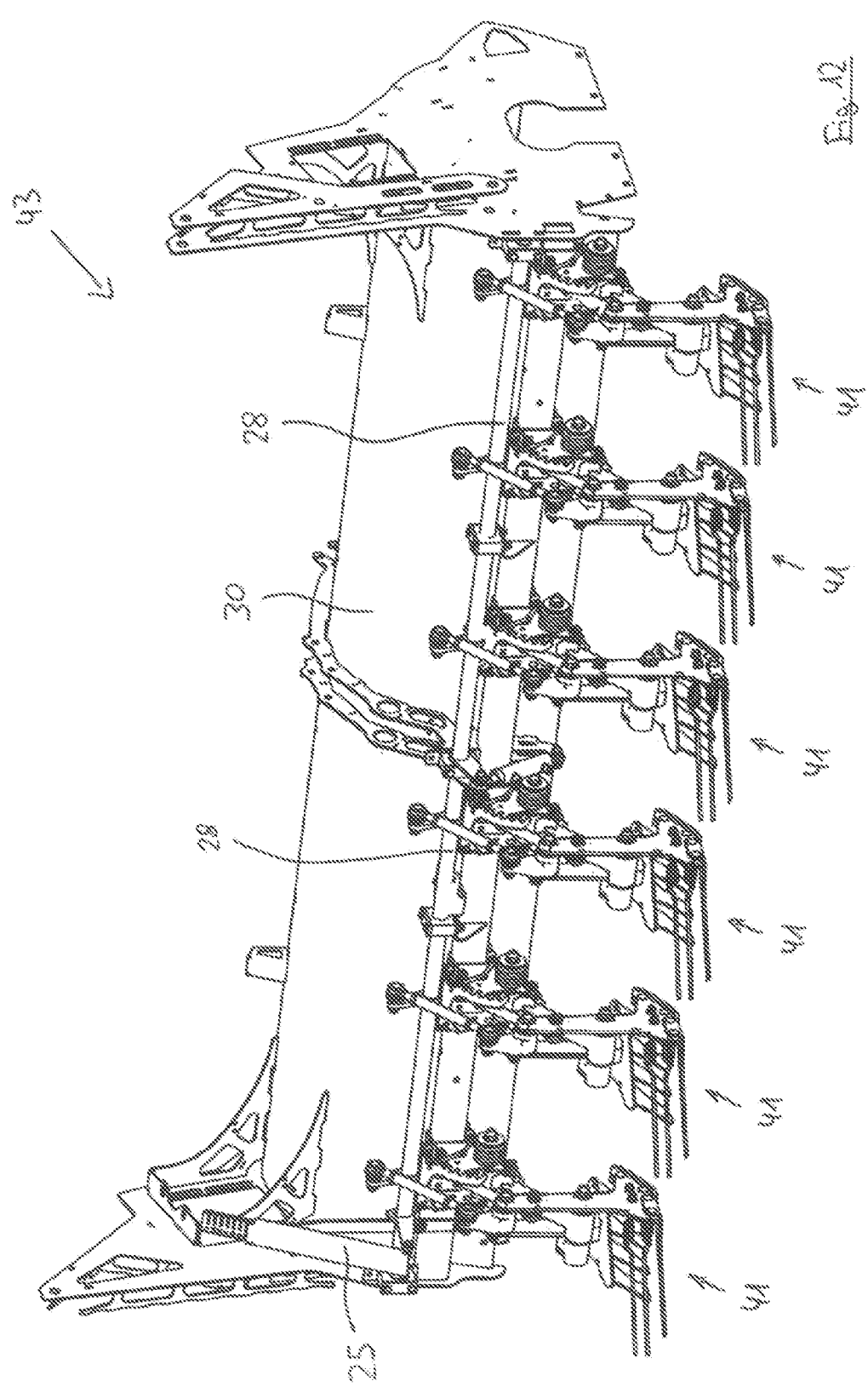
FIG. 12 shows a perspective illustration of the device according to FIG. 11.

FIG. 12 shows the first device 43 with all of its six cutting units 41. Each of the cutting units 41 is assigned an adjustment element 19, which are positionally fixed and in a fixed position relative to one another and to the transverse adjustment element 28. The central adjustment element 25 is arranged at the left end of the transverse adjustment element 28. By this means, the transverse adjustment element 28 is pivotable and fixable in different positions.

Figure 13:
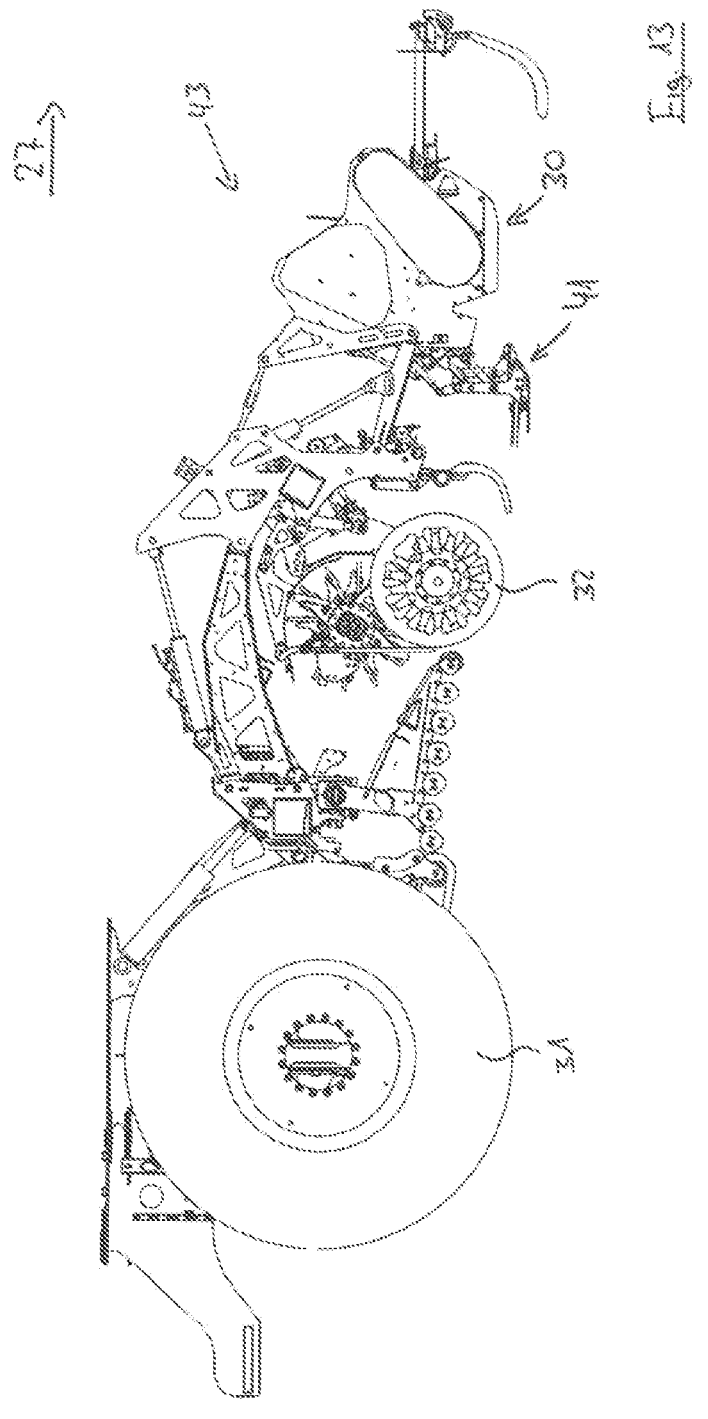
FIG. 13 shows a side view of a second device according to the invention in a mounted state.
Figure 14:
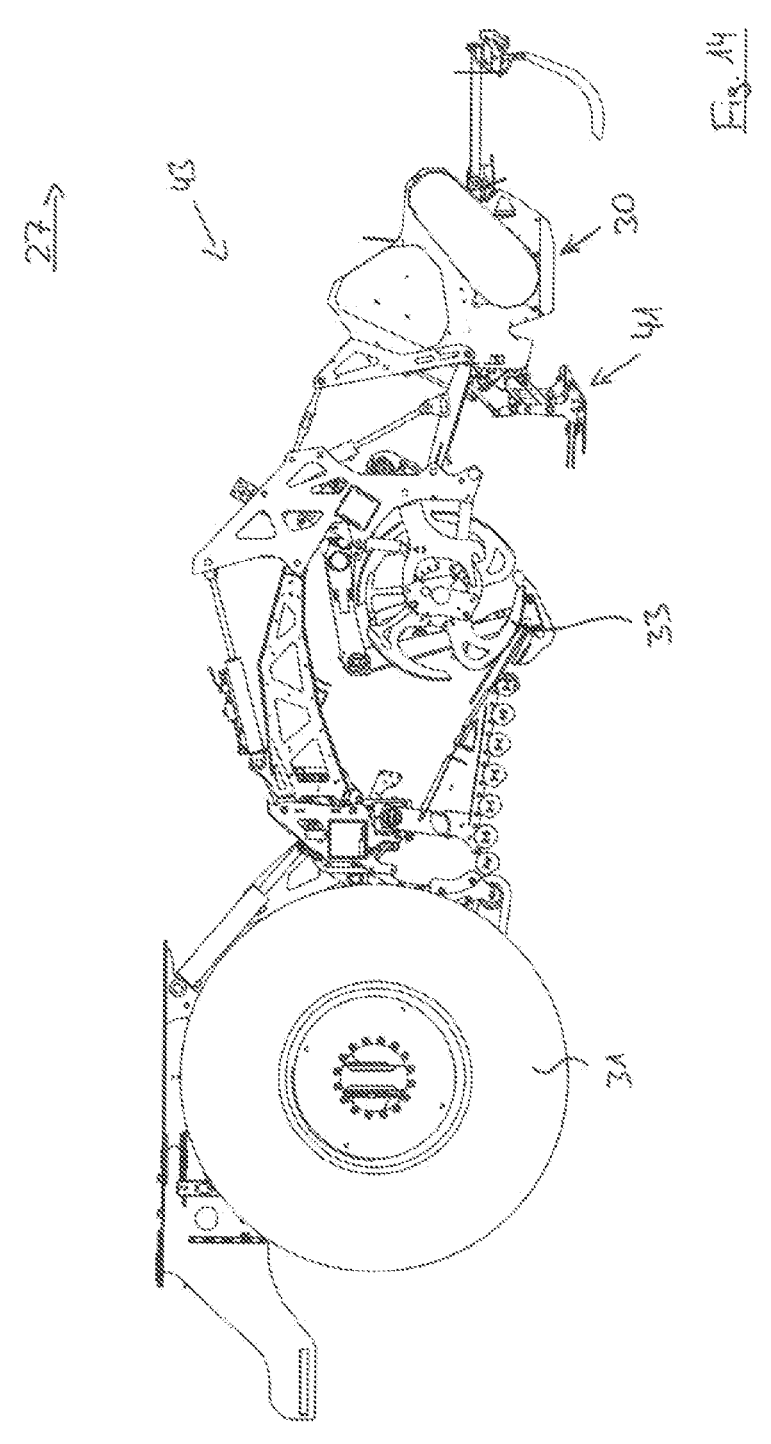
FIG. 14 shows a side view of a third device according to the invention in the mounted state.

FIGS. 13 and 14 show a second and a third device 43, in each case in a state attached to a harvesting machine. All that is in each case illustrated in the harvesting machine is a part of the machine frame and a front wheel 31 which, during operation, trails the device 43 in the direction of travel 27 of the cutting device 40. The device 43 according to FIG. 13 comprises a wheeled lifting share 32 for picking up beets.

The device 43 according to FIG. 14 alternatively comprises a vibrating share 33 for picking up the beets.

Figure 15:
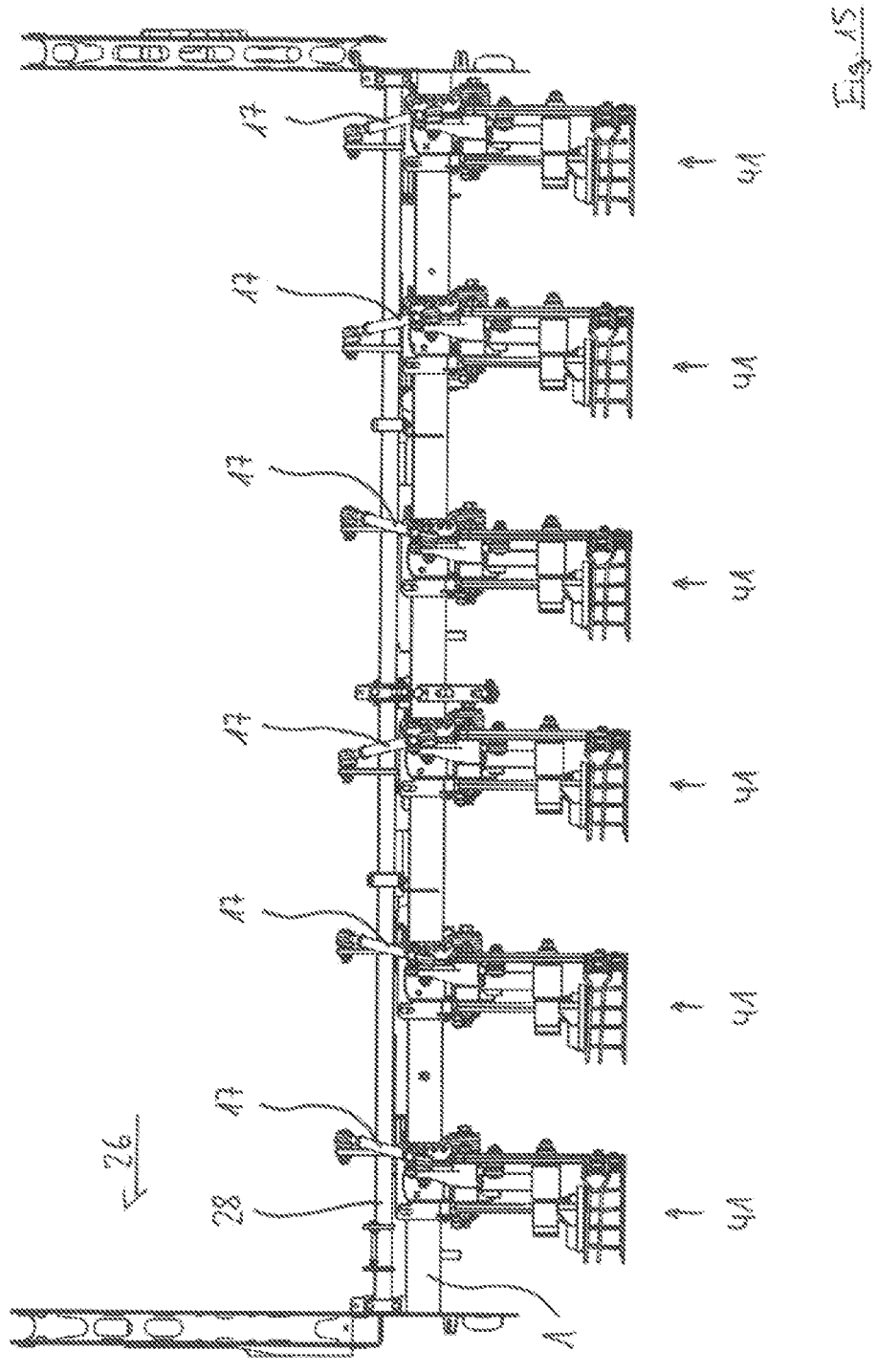
FIG. 15 shows a top view, directed in the direction of travel, of a third cutting device according to the invention in a first working configuration.
Figure 16:
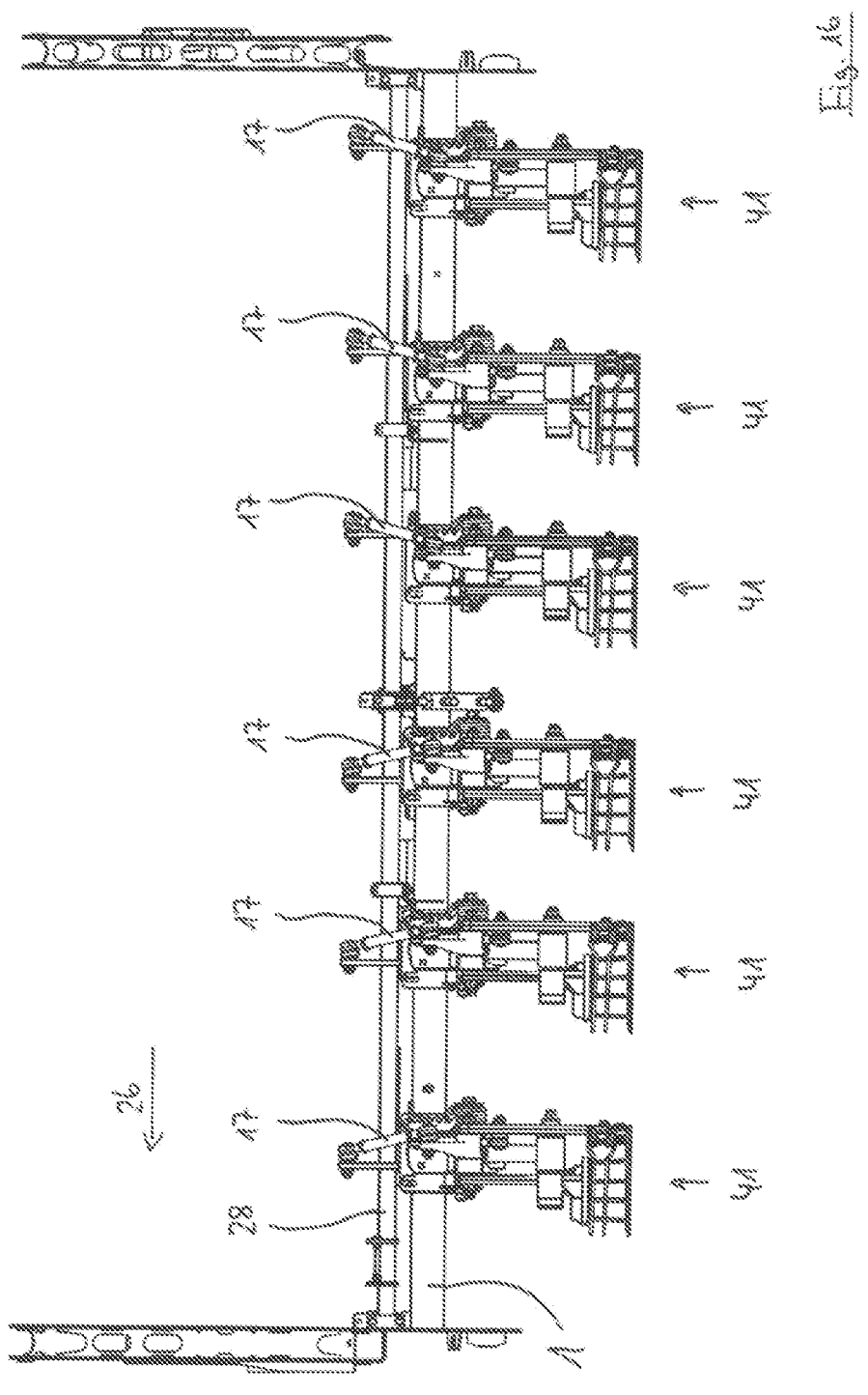
FIG. 16 shows the plan view according to FIG. 15, with the cutting device being in a second working configuration.

FIGS. 15 and 16 show different working configurations of a third cutting device 40 according to the invention. The latter comprises in turn six cutting units 41 and a central transverse adjustment element 28. The cutting device 40 can be used to cut beets irrespective of whether the beet rows are spaced apart by 45 or 50 cm from one another, without having to dispense with the previously described advantages. For this purpose, the adjustment coupling elements 17 are arranged in such a manner that they can be pivoted about a second pivot axis relative to the associated adjustment element 19. In addition, in this exemplary embodiment, the adjustment coupling elements 17 are longer than the frame coupling elements 4, 6.

In the exemplary embodiment which is shown, the central two cutting units 41 are fixed in the transverse direction 26 relative to the cutting device frame 1. Said cutting units are arranged independently of row width in such a manner that their longitudinal center planes are spaced apart from one another by 475 mm. At both of the row widths mentioned, the longitudinal center planes are therefore each arranged offset from the respective row center by 12.5 mm, which is not associated with any significant impairment of the cutting result.

The left two cutting units 41, like the right two cutting units 41, form a pair, within which the respective two cutting units 41 are immovable with respect to one another in the transverse direction 26. The pairs can be displaced as entireties in the transverse direction 26. The longitudinal center planes of the cutting units 41 of the pairs are in turn at a distance from one another of 475 mm. In the working configuration according to FIG. 16, which serves for harvesting beets with row widths of 45 cm, the pairs are displaced toward the central cutting units 41. Both pairs are arranged here in such a manner that the maximum distance of the longitudinal center planes from the respective row center is kept as small as possible. Overall, all of the longitudinal center planes are thereby at a distance of 12.5 mm from the respective row center. The longitudinal center plane of the second cutting units 41, counted from the outside, in this working configuration are at a distance <45 cm from the longitudinal center plane of the cutting unit 41 in each case adjacent toward the center. In comparison to FIG. 16, the pairs in FIG. 15 are arranged displaced outward by 100 mm. For this purpose, a hydraulic cylinder, not illustrated, is arranged on the pairs. In the working configuration according to FIG. 15, which is designed for harvesting beets with row width of 50 cm, all of the longitudinal center planes therefore in turn are at a distance of 12.5 mm from the respective row center, wherein the distance of the longitudinal center planes of the second cutting units 41, counted from the outside, in this working configuration are at a distance >50 cm from the longitudinal center plane of the cutting unit 41 in each case adjacent toward the center.

Figure 17:
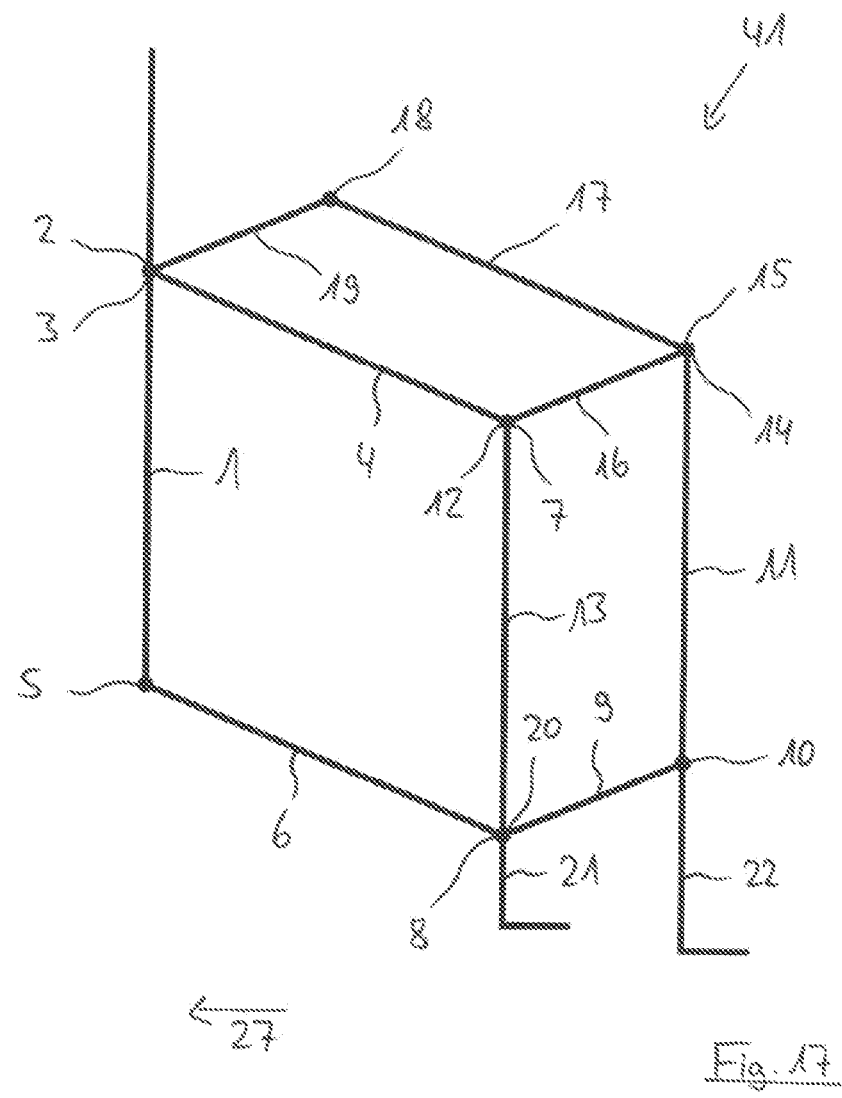
FIG. 17 shows a schematic side view of a cutting unit of a fourth cutting device according to the invention.

FIG. 17 schematically shows a fourth embodiment of the cutting device 40 according to the invention. In this embodiment, the second holding element 11 is arranged behind the first holding element 13 in the direction of travel 27. The first holding coupling element 16 is formed corresponding to the second holding coupling element 9. The fourth and the fifth holding pivot axes 8, 20 are formed coaxially. The first and the third holding pivot axes 7, 12 are also formed coaxially. Furthermore, the second holding pivot axis 14 and the first adjustment coupling pivot axis 15 are formed coaxially. As a result, this embodiment requires particularly little construction space.

LIST OF REFERENCE NUMBERS 1 cutting device frame
2 adjustment frame pivot axis
3 first frame pivot axis
4 first frame coupling element
5 second frame pivot axis
6 second frame coupling element
7 first holding pivot axis
8 fifth holding pivot axis
9 second holding coupling element
10 six holding pivot axis
11 second holding element
12 third holding pivot axis
13 first holding element
14 second holding pivot axis
13 first adjustment coupling pivot axis
16 first holding coupling element
17 adjustment coupling element
18 second adjustment coupling pivot axis
19 adjustment element
20 fourth holding pivot axis
21 probe element
22 cutting element
23 adjustment coupling portion
24 holding coupling portion
25 central adjustment element
26 transverse direction
27 direction of travel
28 transverse adjustment element
29 restoring element
30 haulm removal device
31 front wheel
32 wheeled lifting share
33 vibrating share
40 cutting device
41 cutting unit
42 adjustment device
43 device

The invention claimed is:

1. A cutting device for cutting plants, the cutting device comprising:
   at least one cutting unit including:
      at least one probe element fastened to a first holding element, the at least one probe element determining an extent of a plant,
      at least one cutting element fastened to a second holding element, the at least one cutting element cutting the plant depending on the extent, and
      at least two frame coupling elements, wherein at least one of the first and second holding elements is coupled to a cutting device frame by the frame coupling elements, and the first and second holding elements are arranged movably relative to one another, and
   an adjustment device which is designed to adjust the first and second holding elements relative to one another independently of a movement of at least one of the first and second holding elements relative to the cutting device frame,
   wherein the first and second holding elements are coupled to one another by at least two holding coupling elements which are arranged pivotable on the first and second holding elements,
   wherein the at least two holding coupling elements form a second parallelogram guide.

2. The cutting device as claimed in claim 1, wherein the frame coupling elements are each arranged pivotably on the cutting device frame and on the first holding element and form a first parallelogram guide.

3. The cutting device as claimed in claim 1, wherein the first and second holding elements are coupled to one another in such a manner that they are movable at least partially translationally relative to one another.

4. The cutting device as claimed in claim 1, wherein the adjustment device has at least one adjustment element, which is arranged pivotably on the cutting device frame, for adjusting the first and second holding elements.

5. The cutting device as claimed in claim 1, wherein the second holding element is arranged at least in sections between the cutting device frame and the first holding element with respect to a direction of travel.

6. The cutting device as claimed in claim 1, further including at least two cutting units, wherein the adjustment device adjusts holding elements of different cutting units.

7. A cutting device for cutting plants, the cutting device comprising:
   at least one cutting unit including:
      at least one probe element fastened to a first holding element, the at least one probe element determining an extent of a plant,
      at least one cutting element fastened to a second holding element, the at least one cutting element cutting the plant depending on the extent, and
      at least two frame coupling elements, wherein at least one of the first and second holding elements is coupled to a cutting device frame by the frame coupling elements, and the first and second holding elements are arranged movably relative to one another, and
   an adjustment device which is designed to adjust the first and second holding elements relative to one another independently of a movement of at least one of the first and second holding elements relative to the cutting device frame,
   wherein the first and second holding elements are coupled to one another by at least two holding coupling elements which are arranged pivotable on the first and second holding elements,
   wherein the adjustment device comprises an adjustment coupling element which is arranged on a first of the holding coupling elements and/or on the second holding element.

8. The cutting device as claimed in claim 7, wherein the first holding coupling element has an adjustment coupling portion, which runs at least in sections between a first holding pivot axis, about which the first holding coupling element is arranged pivotably on the first holding element, and a first adjustment coupling pivot axis, about which the adjustment coupling element is pivotable relative to the second holding element and/or to the first holding coupling element, and a holding coupling portion, which runs at least in sections between the first holding pivot axis and a second holding pivot axis, about which the first holding coupling element is arranged pivotably on the second holding element.

9. The cutting device as claimed in claim 8, wherein a second adjustment coupling pivot axis, about which the adjustment coupling element is pivotable relative to the adjustment element, is at a distance from the first adjustment coupling pivot axis, which distance corresponds to the distance of a first frame pivot axis, about which a first frame coupling element is pivotable relative to the cutting device frame, from a third holding pivot axis, about which the first frame coupling element is arranged pivotably on the first holding element.

10. The cutting device as claimed in claim 9, wherein an adjustment frame pivot axis, about which the adjustment element is arranged pivotably on the cutting device frame, and at least the first frame pivot axis are at a distance from one another, which distance corresponds to the distance of the third holding pivot axis from the first holding pivot axis or to the distance of the second holding pivot axis from the first adjustment coupling pivot axis.

11. The cutting device as claimed in claim 7, wherein the adjustment element and the first holding coupling element form a third parallelogram guide at least in a position of the first holding element relative to the cutting device frame.

12. A cutting device for cutting plants, the cutting device comprising:

at least one cutting unit including:

at least one probe element fastened to a first holding element, the at least one probe element determining an extent of a plant, at least one cutting element fastened to a second holding element, the at least one cutting element cutting the plant depending on the extent, and at least two frame coupling elements, wherein at least one of the first and second holding elements is coupled to a cutting device frame by the frame coupling elements, and the first and second holding elements are arranged movably relative to one another, and an adjustment device which is designed to adjust the first and second holding elements relative to one another independently of a movement of at least one of the first and second holding elements relative to the cutting device frame, at least two cutting units, wherein the adjustment device adjusts holding elements of different cutting units, wherein at least one of the cutting units can be transferred in a transverse direction relative to the cutting device frame from a first working configuration into a second working configuration, and the adjustment element adjusts the holding elements of the cutting unit in the first and in the second working configuration.

13. The cutting device as claimed in claim 12, wherein the adjustment coupling element is arranged pivotably relative to the adjustment element about a working configuration pivot axis differing from the second adjustment coupling pivot axis, and the adjustment element remains positionally fixed relative to the cutting device frame during a transfer of the cutting unit from the first into the second working configuration.

14. A device comprising:

a cutting device as claimed in claim 1 and a haulm removal device which is arranged upstream in a direction of travel and has at least one haulm removal element rotating about an axis of rotation during operation, wherein the cutting device frame is arranged in a fixed position relative to the axis of rotation at least during operation.

\* \* \* \* \*